Feb. 7, 1967     L. ROBBINS     3,302,396
DEBRIS SEPARATOR FOR AIRCRAFT GAS TURBINE ENGINE
Filed July 8, 1965
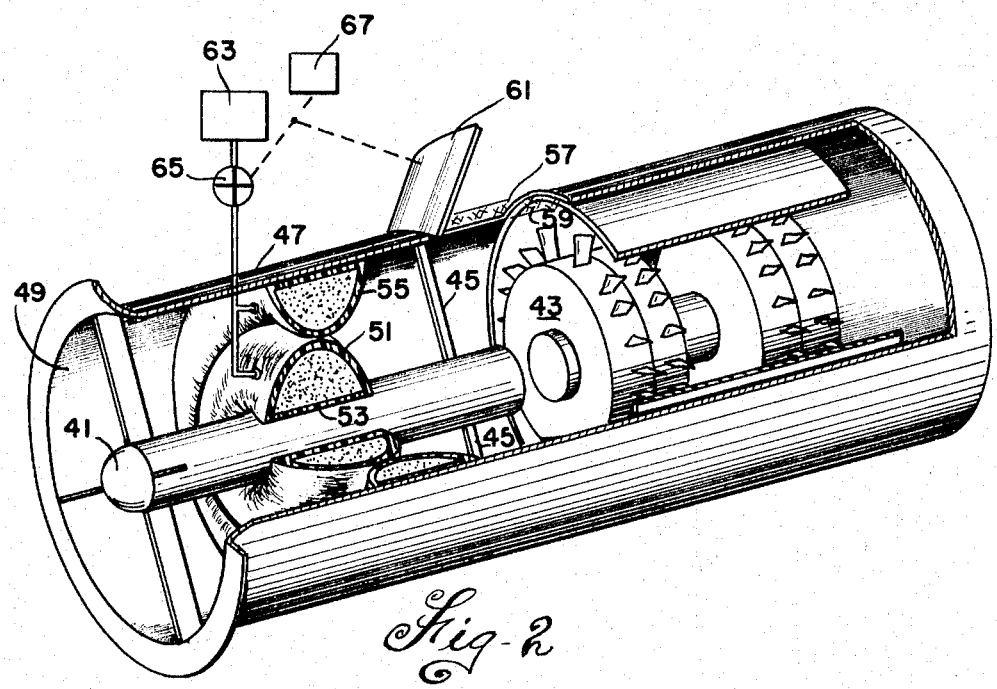
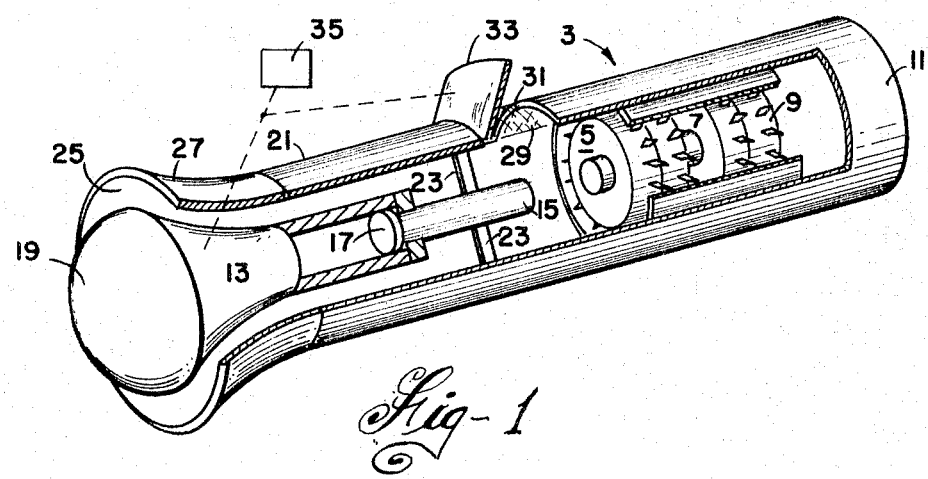
INVENTOR.
LOUIS ROBBINS
BY
ATTORNEY

3,302,396
DEBRIS SEPARATOR FOR AIRCRAFT GAS TURBINE ENGINE
Louis Robbins, 116 David Road, Cynwyd, Pa. 19004
Filed July 8, 1965, Ser. No. 470,648
5 Claims. (Cl. 60—39.09)

The invention described herein may be manufactured and used by or for the Government of the United States of America for governmental purposes without the payment of any royalties thereon or therefor.

The present invention relates to novel and improved axial flow gas turbine engines and more particularly to novel and improved apparatus for preventing entry of foreign objects into the interior of axial flow gas turbine engines.

Aircraft turbine engines are particularly susceptible to damage from foreign objects introduced into the air intake stream of the gas turbine engines. Stones, gravel and other foreign matter drawn into the air stream often rupture, distort and damage blades and other component parts of the compressor of the engine. When this occurs, the desired balanced condition of the compressor is often disrupted and the probable useful life of the engine is shortened if it is not completely destroyed. Aircraft turbine engines have therefore been commonly provided heretofore with air inlet screens and the like to prevent ingestion of sizable foreign objects. Inlet screens of this kind however have been found to produce a safety hazard when ice forms over the screen. They also generally impair the efficiency of the engine by interfering with normal air flow through the engine and frequently these screens break up with disastrous results to the engine.

It is therefore a principal object of the present invention to provide novel and improved apparatus for preventing ingestion of undesirable foreign objects in a gas turbine engine without impairing its efficiency or safe operation.

It is a further object of the present invention to provide novel and improved apparatus for preventing ingestion of undesirable foreign objects in an axial flow gas turbine engine without the use of conventional screening devices.

It is a further object of the present invention to provide novel and improved apparatus which blocks off the normal air intake passage into the engine and provides an alternate screened air charging route, particularly during ground run-up and taxiing maneuvers when the ingestion of foreign objects and debris are most likely.

Other objects and many of the attendant advantages of this invention will be readily appreciated as the same becomes better understood by reference to the following detailed description when considered in connection with the accompanying drawing wherein:

FIG. 1 is a perspective view of a preferred embodiment of the present invention with parts broken away to illustrate the interior construction of the engine.

FIG. 2 is a perspective view with parts broken away of another preferred embodiment of the present invention.

Referring now to FIG. 1 of the drawing, the axial flow turbojet engine 3 includes the compressor 5, the combustion unit 7, and the turbine 9. The engine 3 is not shown in detail in the drawing, since its detailed structure is not material to the invention and since the invention may be employed with compressors, combustion units and turbines of various types. For a complete understanding of the invention, it need only be understood that air enters the air intake end of the compressor 5 and after being compressed is supplied to the combustion unit 7. Motive fluid from the combustion unit 7 then drives the turbine and the jet discharge from the engine exhaust nozzle 11 provides the required forward thrust for the aircraft. The turbine 9 is mechanically coupled to the compressor 5 in any suitable conventional manner to provide the rotary drive for the compressor.

The fairing dome 13 is slidably mounted on a fixed supporting shaft or the like 15 that projects upstream on the extended longitudinal axis of the compressor 5. Shaft 15 is preferably flanged at its outer extremity as at 17 to limit forward movement of the fairing dome 13 therealong. The outer peripheral surface of the dome 13 is flared outwardly between its inner extremity adjacent the compressor 5 and its outer domed extremity 19. The casing or the like 21 is secured to the outer peripheral surface of the compressor 5 preferably by means of the struts or the like 23 and extends substantially concentrically about the dome 13 so as to form an annular air inlet passage 25 for the compressor 5. The outer extremity of the casing 21 is flared outwardly as at 27 so as to generally follow the outwardly flared portion of the fairing dome 13 when the dome occupies its most forwardly extended position. Thus, as will be more apparent hereinafter when the dome 13 occupies its extended position, the annular passage 25 although curving inwardly slightly remains substantially uniform in cross-sectional area. When the dome 13 occupies its retracted position, the outer periphery of the outwardly flared dome 13 engages the inner surface of casing 21 and as will be more apparent hereinafter blocks the supply of air to the compressor 5 through passage 25.

The casing 21 is provided with an opening 29 between the point at which the dome 13 in its retracted position engages the casing 21 and its point of attachment to the compressor 5. The screen or debris filter 31 is secured in the opening 29 in casing 21 in any suitable manner and as will be more apparent hereinafter screens out foreign objects from the engine charging air routed through the opening 29. Trap door or the like 33 is preferably hinged as shown on the leading edge of opening 29 in casing 21. The fairing dome 13 and the trap door 33 are mechanically intercoupled to the air motor other suitable controlled mechanism 35 such that when the dome occupies its retracted position, the trap door 33 is open and when the dome occupies its extended position, the trap door 33 is closed.

In operation, particularly during engine ground runup and taxiing maneuvers, the control mechansm 35 is conditioned such that the fairing dome 13 occupies its retracted position and the trap door or the like 33 is open. When this is done, the annular passage 25 between the casing 21 and the fairing dome 13 is closed and the engine charging air is rerouted through the screened opening 29 into the compressor 5 of the engine. The screen or filter 31 across the opening 29 therefore substantially eliminiates entry of any foreign objects and debris into the engine. When the aircraft is in normal flight and the entry of little, if any foreign objects or debris into the engine is likely, the control mechanism 35 is conditioned such that the fairing dome 13 occupies its extended position and the trap door or the like 33 is closed. Charging air for the engine then passes through the annular passage 25 between the casing 21 and the fairing dome 13 without unfavorably affecting performance of the engine.

Another embodiment of the invention is illustrated in FIG. 2 of the drawing. As shown therein, a fairing dome or the like 41 is secured to the compressor 43 by means of the struts or the like 45 and preferably remains fixed with respect to its stator on an extended longitudinal axis of the compressor The outer casing or the like 47 is mounted concentrically about the fairing dome 41 to form the annular air inlet passage 49 for the compressor.

A first annular inflatable diaphragm 51 is secured on its inner peripheral surface to the outer surface of the dome 41 as at 53. A second annular inflatable diaphragm 55 is secured on its outer peripheral surface to the inner surface of casing 47 at a point opposite the first diaphragm 51.

The casing is provided with an opening between the inflatable diaphragms 51 and 55 and the compressor 43. The screen or debris filter 57 is secured in the opening 59 in casing 47 in any suitable manner and screens out foreign objects from the engine charging air routed through the opening 59. A trap door or the like 61 is preferably hinged as shown on the leading edge of opening 59 in casing 47. The pressurized source of air 63 is connected to diaphragms 51 and 55 through valve 65. Valve 65 and the trap door or the like 61 are mechanically interconnected to the control mechanism 67 such that when diaphragms 51 and 55 are inflated, the trap door 61 is open and when the diaphragms 51 and 55 are deflated, the trap door 61 is closed. Thus, in operation during ground runup and taxiing maneuvers, the control mechanism 67 is conditioned to inflate diaphragms 51 and 55 and open trap door or the like 61 and in normal flight, the control mechanism 67 is conditioned so as to deflate diaphragms 51 and 55 and close trap door or the like 61.

Although two contiguous diaphragms are shown and described hereinabove for at times blocking the flow of air through the annular air inlet passage 49, it is to be understood that a single diaphragm particularly for use on small capacity jet engines could be used without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. In a gas turbine engine including a compressor, a combustion chamber, a turbine and means for transmitting rotary power of the turbine to the compressor, apparatus for preventing entry of foreign objects into the engine, said apparatus comprising:
   (a) a fairing dome mounted on the stator structure of the compressor so as to extend upstream from the compressor along an extended longitudinal axis thereof;
   (b) a casing which is secured to the outer peripheral surface of the stator structure of the compressor and extends substantially concentrically about the dome so as to form an annular air inlet passage for the compressor;
   (c) means for closing the annular air inlet passage;
   (d) a debris filter positioned in an opening in the casing downstream from the annular passage closing means;
   (e) a door for closing the opening in the casing;
   (f) and means coupled between the annular passage closing means and the door for opening the door when the annular passage closure means is closed and closing the door when the annular passage closure means is open.

2. In a gas turbine engine including a compressor, a combustion chamber, a turbine and means for transmitting rotary power of the turbine to the compressor, apparatus for preventing entry of foreign objects into the engine, said apparatus comprising:
   (a) a fairing dome slidably mounted on the stator structure of the compressor so as to extend a variable distance upstream from the compressor along an extended longitudinal axis thereof, the outer peripheral surface of the dome being flared outwardly between its extremity adjacent the compressor and its upstream extremity;
   (b) a casing which is secured to the outer peripheral surface of the stator structure of the compressor and extends substantially concentrically about the dome so as to form an annular air inlet passage for the compressor;
   (c) means for controlling disposition of the slidable dome along the extended axis of the compressor between an extended position where the annular air inlet passage is substantially unobstructed and a retracted position where the outwardly flared dome engages the inner peripheral surface of the casing;
   (d) a debris filter positioned in an opening in the casing downstream from the point at which the dome engages the casing in its said retracted position;
   (e) a closure for the opening in the casing;
   (f) and means coupled between the dome and the said closure for opening the closure when the dome occupies its retracted position and closing the closure when the dome occupies its extended position.

3. In a gas turbine engine including a compressor, a combustion chamber, a turbine and means for transmitting rotary power of the turbine to the compressor, apparatus for preventing entry of foreign objects into the engine, said apparatus comprising:
   (a) a fairing dome slidably mounted on the stator structure of the compressor so as to extend a variable distance upstream from the compressor along an extended longitudinal axis thereof, the outer peripheral surface of the dome being flared outwardly between its extremity adjacent the compressor and its upstream extremity;
   (b) a casing which is secured to the outer peripheral surface of the stator structure of the compressor and extends substantially concentrically about the dome so as to form an annular air inlet passage for the compressor, the upstream extremity of the casing being flared outwardly;
   (c) means for controlling disposition of the slidable dome along the extended axis of the compressor between an extended position where the flared extremities of the dome and casing are substantially concentric with one another and a retracted position where the outwardly flared dome engages the inner peripheral surface of the casing;
   (d) a debris filter positioned in an opening in the casing downstream from the point at which the dome engages the casing in its said retracted position;
   (e) a closure for the opening in the casing;
   (f) and means coupled between the dome and the said closure for opening the closure when the dome occupies its retracted position and closing the closure when the dome occupies its extended position.

4. In a gas turbine engine including a compressor, a combustion chamber, a turbine and means for transmitting rotary power of the turbine to the compressor, apparatus for preventing entry of foreign objects into the engine, said apparatus comprising:
   (a) a fairing dome mounted on the stator structure of the compressor so as to extend upstream from the compressor along an extended longitudinal axis thereof;
   (b) a casing which is secured to the outer peripheral surface of the stator structure of the compressor and extends substantially concentrically about the dome so as to form an annular air inlet passage for the compressor;
   (c) an inflatable diaphragm which is secured to the inner peripheral surface of the casing and which when inflated closes the annular air inlet passage to the compressor;
   (d) means for inflating the diaphragm;
   (e) a debris filter positioned in an opening in the casing downstream from the diaphragm;
   (f) a closure for the opening in the casing;
   (g) and means coupled between the diaphragm inflating means and the said closure for opening the closure when the diaphragm is inflated and closing the closure when the diaphragm is deflated.

5. In a gas turbine engine including a compressor, a combustion chamber, a turbine and means for transmitting rotary power of the turbine to the compressor, apparatus for preventing entry of foreign objects into the engine, said apparatus comprising:
   (a) a fairing dome mounted on the stator structure of the compressor so as to extend upstream from the compressor along an extended longitudinal axis thereof;
   (b) a casing which is secured to the outer peripheral surface of the stator structure of the compressor and extends substantially concentrically about the dome so as to form an annular air inlet passage for the compressor;
   (c) a first diaphragm which is secured to the inner peripheral surface of the casing;
   (d) a second diaphragm which is secured to the juxtaposed outer peripheral surface of the dome, said first and second diaphragms when inflated closing the annular air inlet passage to the compressor;
   (e) means for inflating said diaphragms;
   (f) a debris filter positioned in an opening in the casing downstream from said diaphragms.
   (g) a closure for the opening in the casing;
   (h) and means coupled between the diaphragm inflating means and the said closure for opening the closure when the diaphragms are inflated and closing the closure when the diaphragms are deflated.

References Cited by the Examiner
UNITED STATES PATENTS

| | | | |
|---|---|---|---|
| 2,604,278 | 7/1952 | Johnson | 244—53.8 |
| 2,677,232 | 5/1954 | Collins | 60—35.6 |
| 2,744,382 | 5/1956 | Sokol et al. | 60—39.09 |
| 2,763,426 | 9/1956 | Erwin | 244—53.8 |
| 2,963,856 | 12/1960 | Caddell | 60—39.09 |

CARLTON R. CROYLE, *Primary Examiner.*